United States Patent
Alkathami

(10) Patent No.: US 9,369,151 B2
(45) Date of Patent: Jun. 14, 2016

(54) APPARATUS AND METHOD FOR RESOURCE ALLOCATION

(71) Applicant: Ali Misfer Alkathami, Albashair (SA)

(72) Inventor: Ali Misfer Alkathami, Albashair (SA)

( * ) Notice: Subject to any disclaimer, the term of this patent is extended or adjusted under 35 U.S.C. 154(b) by 99 days.

(21) Appl. No.: 14/496,183

(22) Filed: Sep. 25, 2014

(65) Prior Publication Data

US 2016/0094244 A1   Mar. 31, 2016

(51) Int. Cl.
*H03M 13/09* (2006.01)
*H03M 13/00* (2006.01)
*H03M 13/11* (2006.01)
*H03M 13/25* (2006.01)
*H04L 1/00* (2006.01)
*G06F 11/10* (2006.01)
*H04L 9/30* (2006.01)
*G06F 12/02* (2006.01)
*H04J 13/10* (2011.01)
*H04J 13/16* (2011.01)

(52) U.S. Cl.
CPC .............. *H03M 13/095* (2013.01); *G06F 11/10* (2013.01); *G06F 11/1068* (2013.01); *G06F 12/0207* (2013.01); *H03M 13/116* (2013.01); *H03M 13/1165* (2013.01); *H03M 13/1168* (2013.01); *H03M 13/255* (2013.01); *H03M 13/616* (2013.01); *H03M 13/6508* (2013.01); *H04J 13/10* (2013.01); *H04J 13/16* (2013.01); *H04L 1/005* (2013.01); *H04L 1/0061* (2013.01); *H04L 9/304* (2013.01)

(58) Field of Classification Search
CPC .......... H03M 13/095; H03M 13/6508; H03M 13/116; H03M 13/1165; H03M 13/255; H03M 13/1168; H03M 13/616; H04L 1/005; H04L 1/0061; H04L 9/304; G06F 11/10; G06F 11/1068; G06F 12/0207; H04J 13/10; H04J 13/16

USPC ........ 714/776, 752, /764, 786, 801, 810, 821; 370/208; 375/260
See application file for complete search history.

(56) References Cited

U.S. PATENT DOCUMENTS

| | | | |
|---|---|---|---|
| 6,206,372 B1 | 3/2001 | Harris | |
| 8,291,283 B1 * | 10/2012 | Rad | H03M 13/036 714/752 |
| 8,347,200 B1 * | 1/2013 | Jakka | H03M 13/1102 714/776 |
| 9,128,858 B1 * | 9/2015 | Micheloni | G06F 11/10 |
| 2004/0170121 A1 * | 9/2004 | Kim | H04B 1/69 370/208 |
| 2008/0028274 A1 * | 1/2008 | Lin | H03M 13/1108 714/752 |

(Continued)

OTHER PUBLICATIONS

Boris Aronov, et al., "A Generalization of Magic Squares with Application to Digital Halftoning", http://cis.poly.edu/~aronov/papers/magic-j.pdf.

(Continued)

*Primary Examiner* — John J Tabone, Jr.
(74) *Attorney, Agent, or Firm* — Oblon, McClelland, Maier & Neustadt, L.L.P.

(57) ABSTRACT

An apparatus and a method for allocating network resources in a fair manner. The method includes determining for a first matrix of a certain dimension and a corresponding set of predetermined numbers, a second allocation matrix, wherein the numbers allocated to cells of the second matrix are such that the sum of the numbers in any row, column, diagonal, or anti-diagonal equal the same number. Based on predetermined priorities, a row, column, diagonal, or an anti-diagonal of the second allocation matrix is selected to correspond to the allocated network resources.

20 Claims, 13 Drawing Sheets

(56) References Cited

U.S. PATENT DOCUMENTS

| | | | | |
|---|---|---|---|---|
| 2008/0123660 | A1* | 5/2008 | Sammour | H04L 47/10 370/395.21 |
| 2008/0192702 | A1* | 8/2008 | Song | H04W 52/265 370/332 |
| 2010/0023838 | A1* | 1/2010 | Shen | H03M 13/1105 714/758 |
| 2010/0146229 | A1* | 6/2010 | Yang | G06F 12/0207 711/157 |
| 2011/0179333 | A1* | 7/2011 | Wesel | H03M 13/1111 714/752 |
| 2012/0002740 | A1* | 1/2012 | Han | H04L 5/0048 375/260 |
| 2012/0221914 | A1* | 8/2012 | Morero | H03M 13/015 714/752 |
| 2014/0105403 | A1* | 4/2014 | Baldi | H04L 9/0861 380/282 |
| 2014/0126674 | A1* | 5/2014 | Petrov | H03M 13/1165 375/340 |
| 2014/0129895 | A1* | 5/2014 | Petrov | H03M 13/1142 714/752 |
| 2014/0129898 | A1* | 5/2014 | Letunovskiy | H03M 13/015 714/755 |
| 2014/0298132 | A1* | 10/2014 | Wu | H03M 13/1108 714/758 |
| 2014/0369320 | A1* | 12/2014 | Gurcan | H04B 7/0043 370/335 |
| 2015/0046768 | A1* | 2/2015 | Hu | H03M 13/611 714/758 |
| 2015/0128012 | A1* | 5/2015 | Petrov | H03M 13/1165 714/776 |
| 2015/0363265 | A1* | 12/2015 | Liu | G06F 11/1068 714/764 |

OTHER PUBLICATIONS

Dzone, Inc.,"Java Program to Generate Magic Square", http://www.dzone.com/snippets/java-proqram-generate-magic, Mar. 27, 2012.

* cited by examiner

|  COL 5 | COL 4 | COL 3 | COL 2 | COL 1 |       |
|---|---|---|---|---|---|
| 5  | 4  | 3  | 2  | 1  | ROW 1 |
| 10 | 9  | 8  | 7  | 6  | ROW 2 |
| 15 | 14 | 13 | 12 | 11 | ROW 3 |
| 20 | 19 | 18 | 17 | 16 | ROW 4 |
| 25 | 24 | 23 | 22 | 21 | ROW 5 |

| 5 | 4  | 3 | 2 | 1 | ROW 1 |
|---|----|---|---|---|-------|
| 6 | 10 | 9 | 8 | 7 | ROW 2 |
|   |    |   |   |   |       |
|   |    |   |   |   |       |
|   |    |   |   |   |       |

|  COL 5 | COL 4 | COL 3 | COL 2 | COL 1 | |
|---|---|---|---|---|---|
| 5 | 4 | 3 | 2 | 1 | ROW 1 |
| 6 | 10 | 9 | 8 | 7 | ROW 2 |
| 12 | 11 | 15 | 14 | 13 | ROW 3 |
| 18 | 17 | 16 | 20 | 19 | ROW 4 |
| 24 | 23 | 22 | 21 | 25 | ROW 5 |

*Fig. 5C* — 300

| COL 5 | COL 4 | COL 3 | COL 2 | COL 1 | |
|---|---|---|---|---|---|
|  |  |  |  | 15 | ROW 1 |
|  |  |  | 14 |  | ROW 2 |
|  |  | 13 |  |  | ROW 3 |
|  | 12 |  |  |  | ROW 4 |
| 11 |  |  |  |  | ROW 5 |

*Fig. 6* — 500

|  | COL 5 | COL 4 | COL 3 | COL 2 | COL 1 |  |
|---|---|---|---|---|---|---|
| ROW 1 | 17 | 24 | 1 | 8 | 15 | |
| ROW 2 | 23 | 5 | 7 | 14 | 16 | |
| ROW 3 | 4 | 6 | 13 | 20 | 22 | |
| ROW 4 | 10 | 12 | 19 | 21 | 3 | |
| ROW 5 | 11 | 18 | 25 | 2 | 9 | |

APPARATUS AND METHOD FOR RESOURCE ALLOCATION

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Time-division multiplexed (TDM) networks transmit and receive independent signals over a common signal path by means of synchronized switches located at each end of a transmission line. Thus, each signal appears on the transmission line only for a fraction of time. Specifically, the content of each signal is transferred in such a manner such that it appears as if the transmissions are occurring in a simultaneous fashion over sub-channels in one communication channel. However, the signals are physically taking turns for transmission on the channel. The time domain includes time-frames, each of which is divided into several recurrent time-slots, one time-slot for each sub-channel.

In such a time-division multiplexed network, the data packets of each input stream are usually encoded with a cyclic-redundancy check (CRC) code that ensures that the data packets are not corrupted by errors caused due to noise in the transmission channel. The CRC code that is commonly used in conjunction with the data packets is of a fixed length. For instance, commonly used CRC codes are of type CRC-8 (9 bits), CRC-16(17 bits), CRC 32(33 bits), CRC-64 (65 bits) and the like. The fixed length restriction on the CRC codes for each data packet is imposed to due to the requirement of having synchronized switching within the TDM network. Thus, the encoding mechanism implemented by CRC coding schemes results in the use of the same length error-code for each data packet and makes no distinction whatsoever between the potentially different types of data packets.

Accordingly, there is a requirement for a coding mechanism that differentiates between the different types of data packets and encodes the data packets by using variable length codes, while ensuring that the requirements of synchronized time-frame switching are adhered to.

SUMMARY

The present disclosure describes an apparatus and a method of providing variable length codes to data packets that are included in a time-frame and switched synchronously within a time-division-multiplexed network. The data packets may originate from a variety of applications such as real-time applications like video-conferencing that have stringent delay tolerances, or may be data packets that carry information of a simple file transfer, web-page download or the like that have relaxed delay tolerances. Based on the application at hand, the data packets within a time-frame may be assigned different priority levels. Thus, a method of encoding such data packets is required, wherein data packets that have a high priority level are encoded with a higher number of binary bits as compared to data packets having low priority levels that are encoded with a less number of binary bits. The variable length encoding scheme according to the present embodiment also ensures that the time-frames have the same length thus guarantying that the TDM frames are switched in a synchronous manner.

Alternatively, according to another embodiment, the method of the present disclosure also provides for the allocation of bandwidth channels from a plurality of bandwidth channel types to a plurality of users. A network controller (bandwidth allocator) receives bandwidth demand request from users. Each request from the user may require bandwidth channels of different types based on the requirement of the user. For instance, a network may provide its users voice channels, low speed data channels, high speed optical channels or the like. A user may require a higher number of a certain type of bandwidth channel based on the user's application. For instance, a scientist who is engaged in a scientific experiment such as the large hadron collider experiment, may require a greater number of high-speed optical (as compared to the number of low speed data channels) in order to transfer/process experiment data from one laboratory to another. Similarly, a business organization such as a customer service center may require a higher number of voice channels to support the high volume of voice calls, as compared to the number of required high speed optical channels.

Accordingly, the method of the present disclosure provides for allocation of the plurality of bandwidth channels amongst a group of users, while ensuring that the users with a similar service level agreement have the same total network bandwidth allocated to them. In other words, the method of the present disclosure provides for a fair allocation of network bandwidth amongst users while adhering to the service level agreements of the different users.

Accordingly, an aspect of the present disclosure provides a method of determining sizes of error-detection-code blocks of data packets that are transmitted in time-frames. The method includes: receiving, by a switch, a predetermined number of data packets that are to be transmitted in each time-frame, each data packet within the time-frame having a unique priority level; assigning sequentially, by a processing circuit, numbers of a predetermined set to cells of a first square matrix; shifting cyclically by the processing circuit, starting from an initial row of the first matrix, the assigned numbers of each row in a rightward direction, such that the smallest number in each row is placed under a largest number of the preceding row; sorting in an increasing fashion, by the processing circuit, the numbers of a middle row of the first matrix; ordering by the processing circuit, the sorted numbers to an anti-diagonal of a second square matrix; identifying, for each sorted number assigned to the anti-diagonal of the second matrix, a column in the first matrix that includes the sorted number; selecting, by the processing circuit, for each identified column in the first matrix, numbers other than the sorted number in the identified column, the selecting being performed in a cyclic bottom-up fashion starting at a row immediately following the middle row in the first matrix; allocating by the processing circuit, the selected numbers from the identified column in the first matrix to a corresponding column in the second matrix, the allocating being performed in a cyclic bottom-up fashion beginning at a cell position immediately below the anti-diagonal cell in the corresponding column of the second matrix; and assigning, based on the unique priority levels of the data packets within the time-frame, data blocks of sizes corresponding to the numbers of a selected row, column, or diagonal of the second matrix.

According to another embodiment of the present disclosure is provided a network switch that is configured to determine sizes of error-detection-code blocks of data packets that are transmitted in time-frames. The switch includes: a receiver configured to receive a predetermined number of data packets that are to be transmitted in each time-frame, each data packet within the time-frame having a unique priority level. Furthermore, the switch also includes circuitry that is configured to: assign sequentially, numbers of a predetermined set to cells of a first square matrix, shift cyclically, starting from an initial row of the first matrix, the assigned numbers of each row in a rightward direction, such that the smallest number in each row is placed under a largest number of the preceding row, sort in an increasing fashion, the numbers of a middle row of the first matrix, order the sorted numbers to an anti-diagonal of a second square matrix, identify, for each sorted number assigned to the anti-diagonal of the second matrix, a column in the first matrix that includes the sorted number, select for each identified column in the first matrix, numbers other than the sorted number in the identified column, the selection being performed in a cyclic bottom-up fashion starting at a row immediately following the middle row in the first matrix allocate the selected numbers from the identified column in the first matrix to a corresponding column in the second matrix, the allocation being performed in a cyclic bottom-up fashion beginning at a cell position immediately below the anti-diagonal cell in the corresponding column of the second matrix, and assign based on the unique priority levels of the data packets within the time-frame, data blocks of sizes corresponding to the numbers of a selected row, column, or diagonal of the second matrix.

According to another embodiment of the disclosure is provided a method of allocating bandwidth channels from a plurality of bandwidth channel types. The method includes: receiving bandwidth request from a predetermined number of users, each request identifying a priority of a bandwidth channel type desired by the user; assigning sequentially, by a processing circuit, numbers of a predetermined set to cells of a first square matrix; shifting cyclically by the processing circuit, starting from an initial row of the first matrix, the assigned numbers of each row in a rightward direction, such that the smallest number in each row is placed under a largest number of the preceding row; sorting in an increasing fashion, by the processing circuit, the numbers of a middle row of the first matrix; ordering by the processing circuit, the sorted numbers to an anti-diagonal of a second square matrix; identifying, for each sorted number assigned to the anti-diagonal of the second matrix, a column in the first matrix that includes the sorted number; selecting, by the processing circuit, for each identified column in the first matrix, numbers other than the sorted number in the identified column, the selecting being performed in a cyclic bottom-up fashion starting at a row immediately following the middle row in the first matrix; allocating by the processing circuit, the selected numbers from the identified column in the first matrix to a corresponding column in the second matrix, the allocating being performed in a cyclic bottom-up fashion beginning at a cell position immediately below the anti-diagonal cell in the corresponding column of the second matrix; and assigning, based on the priority of the bandwidth channel type desired by the user, a number of bandwidth channels of each type, wherein the number corresponds to numbers of a selected row, column, or diagonal of the second matrix.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Various embodiments of this disclosure that are proposed as examples will be described in detail with reference to the following figures, wherein like numerals reference like elements, and wherein:

FIGS. 5A-5C illustrate an exemplary example of a first 5×5 allocation matrix;

FIG. 6 depicts an example of a second allocation matrix;

FIGS. 7A-7C illustrate an example depicting the processing performed on the second allocation matrix;

DETAILED DESCRIPTION

Figure 1:
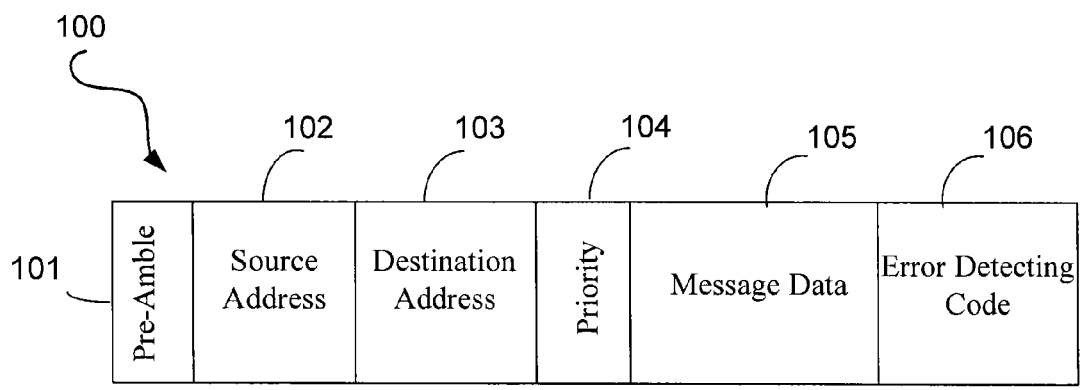
FIG. 1 illustrates a block diagram of a data packet according to an embodiment.

FIG. 1 illustrates a block diagram of a data packet according to one embodiment of the present disclosure. The data packet 100 includes a preamble 101, a source address 102, a destination address 103, a priority block 104, message data 105, and an error-detecting code 106.

The preamble 101 is created by a network card that is included in a network switch. The preamble is a fixed length of block, for instance a 64-bit field of synchronized binary 1's and 0's, ending with two consecutive 1's. The preamble enables the switch to locate the first bit of the data packet. The source address field 102 is a field that contains the physical hardware or a medium access control address of the transmitter that is sending the data packet. For instance, the source address can be fixed length, 48-bit field of binary 1's and 0's. The destination address 103 is a binary field includes a physical hardware address to where the data packet is to be delivered. The destination address may be a 48-bit binary field of fixed length.

According to one embodiment, the priority block is a fixed length block that includes the priority level of a data packet that is transmitted in a time-frame within the TDM network. For instance, if a time-frame includes ten data packets in a time-frame, the priority level of each data packet can assume a number in the range 1 to 10. According to one embodiment, a low number may be assigned to a data packet of high priority. Alternatively, the network operator may choose to assign a high number to indicate a high priority data packet. A high priority data packet may be for instance, a data packet that has low transmission delay tolerances. The message data 105 includes data that is to be transported to a specific destination. The error-detecting code 106 is a block that includes binary bits that ensure that the data packet reaches its intended destination free of errors. According to one embodiment, the error-detecting code is a variable length block, the length of which is determined based on the priority level of the data packet that is being transferred in the time-frame.

Figure 2:
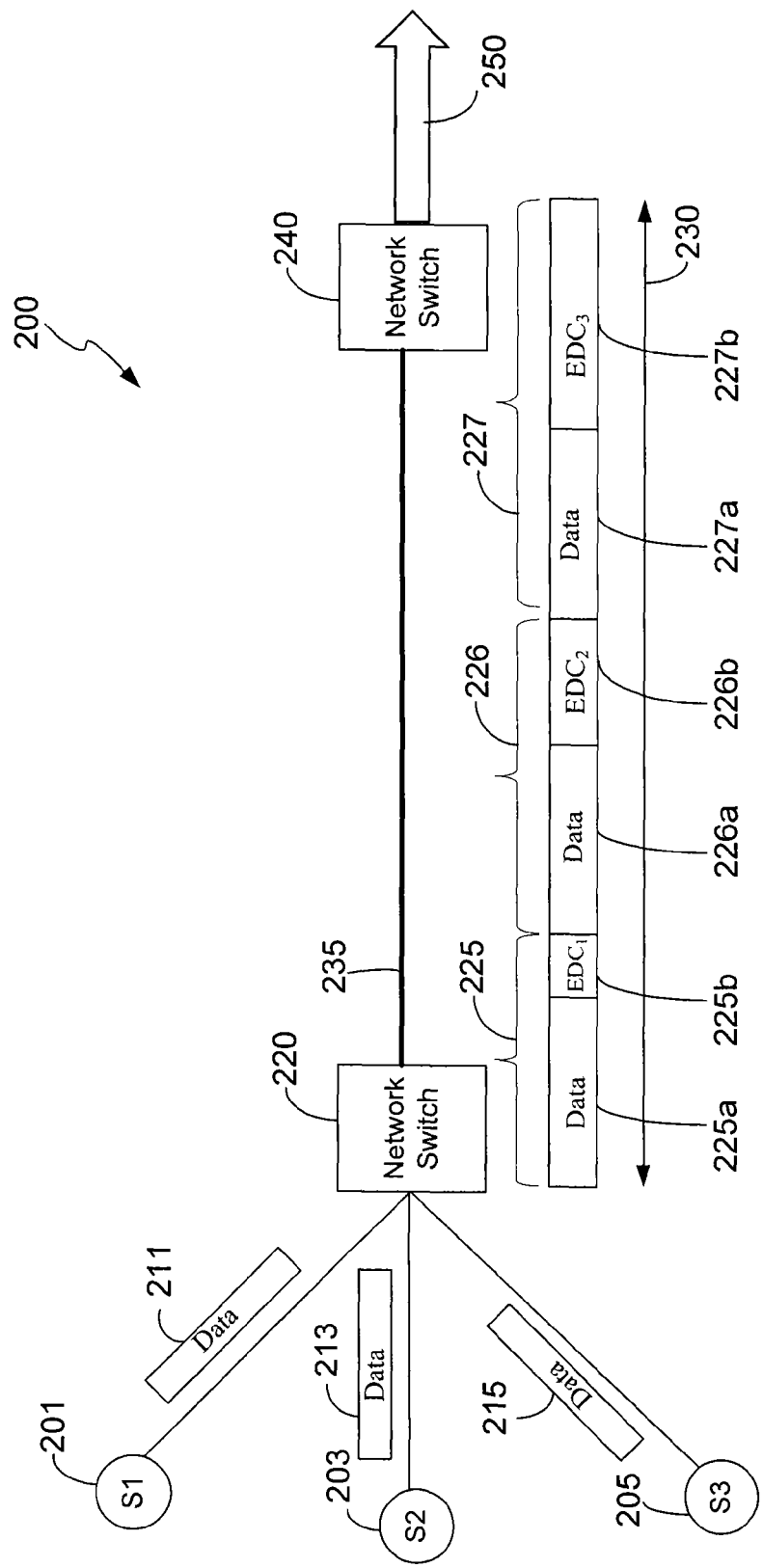
FIG. 2 illustrates a time-division multiplexed transmission channel according to an embodiment.

FIG. 2 illustrates a time-division multiplexed transmission channel 200 according to one embodiment. The transmission channel 200 depicted in FIG. 2 can be a part of a large wide area network, a local area network, or the like.

In FIG. 2, network switches 220 and 240 are connected to each other by a transmission channel 235. The network switch 220 receives data packets from input sources S1, S2, and S3 that are represented as 201, 203 and 205, respectively. The data sources 201, 203, and 205 may be other network switches within the network or end-user terminal that transmits the data packet. As shown in FIG. 2, source S1 (201) transmits a data packet 211, source S2 (203) transmits a data packet 213, and source S3 (205) transmits a data packet 215 to the network switch 220. In the present example, it is assumed for the sake of convenience that only three data packets 211, 213, 215 are to be transmitted in a time-frame 230. The network switch 220 includes a controller that is configured to determine the error-detection-code blocks for each of the incoming data packets and transport the data packets on an outgoing time-frame 230. Specifically, the network switch includes a controller that determines the error-detecting code block 225b, for the data packet 211 and transports the data packet as the data packet 225 that includes a data block 225a and the error-detecting code block 225b. Similarly, the network switch is configured to determine the error-detecting code for data packets 226 and 227 (represented as 226B and 227B).

According to one embodiment, the controller is configured to determine the length of the error-detecting-code blocks for each data packet 225-227 based on a priority level (included in the priority block of each data packet) of the data packet within the transmission time-frame. The computation of the length of each error-detecting-code block of each data packet is described later with reference to FIG. 3 and FIG. 4. The network switch 220 upon transmitting the time-frame, which includes the data packets 225, 226, and 227, transmits the time-frame to the network switch 240 over the transmission channel 235. The network switch 240 upon receiving the time-frame switches the contents of the time-frame to the next network switch included within the network, as represented by arrow 250. Note that the boundaries of each data packet can be discerned with reference to the preamble block of each data packet. Thus the network switch of the present disclosure is enabled to switch data packets in an individual fashion.

Figure 3:
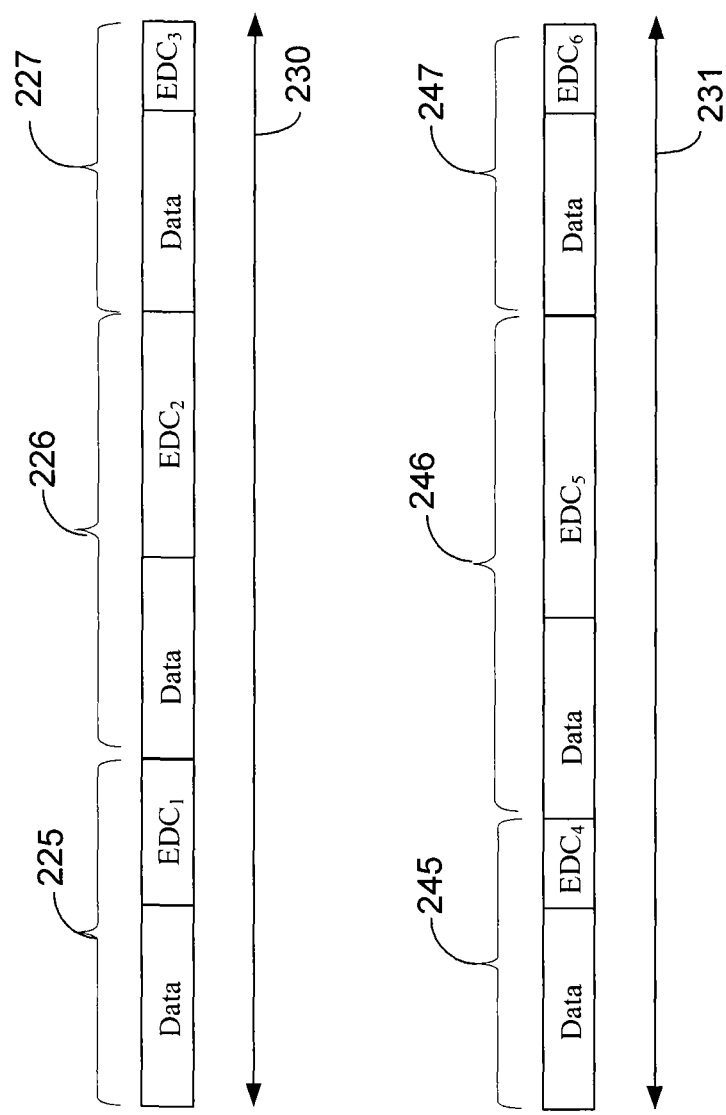
FIG. 3 illustrates an exemplary example of time-frames transmitted on the transmission channel.

FIG. 3 illustrates an exemplary example of time-frames transmitted on the transmission channel 235 of FIG. 2. In the following, only two time-frames 230 and 231 are represented for the sake of convenience. Time-frame 230 includes three data packets 225, 226, and 227, whereas time-frame 231 includes data packets 245, 246, and 247. In the time-frame 230 each of the data packets 225-227 includes an error-detecting-code block represented by $EDC_1$, $EDC_2$, and $EDC_3$. Similarly, each data packet in time-frame 231 includes an error-detecting-code block represented by $EDC_4$-$EDC_6$. The length of each error-detecting-code block within a time-frame is determined based on the priority level of the data packet within the time-frame. Note that the priority level is included in the data packet as in the priority block 104 as shown in FIG. 1. According to one embodiment, the priority level of each data packet may be a sequential number starting from 1, 2 ... N, where N represents the number of data packets included within the time-frame. Thus, based on the priority level of each data packet, the length of each error-detecting-code block is determined by the controller of the network switch. For instance, a higher priority data block may be encoded by an error-detecting-code block of a greater length, as compared to a data packet having a lower priority level. The method implemented by the controller in determining the length of the error-detecting-code block is described later with reference to FIG. 4. The method, however, ensures that although each data packet within the time-frame is encoded with a different length of error-detecting-code block, the total length of the error-detecting-code blocks belonging to a particular time-frame sum to a predetermined number. For instance, the sum of the lengths of the error-detecting code blocks may sum to X bits, wherein the magnitude of X is determined as described below with reference to FIG. 4. Thus, the following equations hold true for the time-frames 230 and 231, represented in FIG. 3:

$$EDC_1+EDC_2+EDC_3=X \text{ bits} \qquad (1)$$

$$EDC_4+EDC_5+EDC_6=X \text{ bits} \qquad (2)$$

Accordingly, the length of the error-detecting code blocks of each time-frame sum up to the same value, thus ensuring that the length of each time-frame within the TDM network is the same.

Figure 4A:
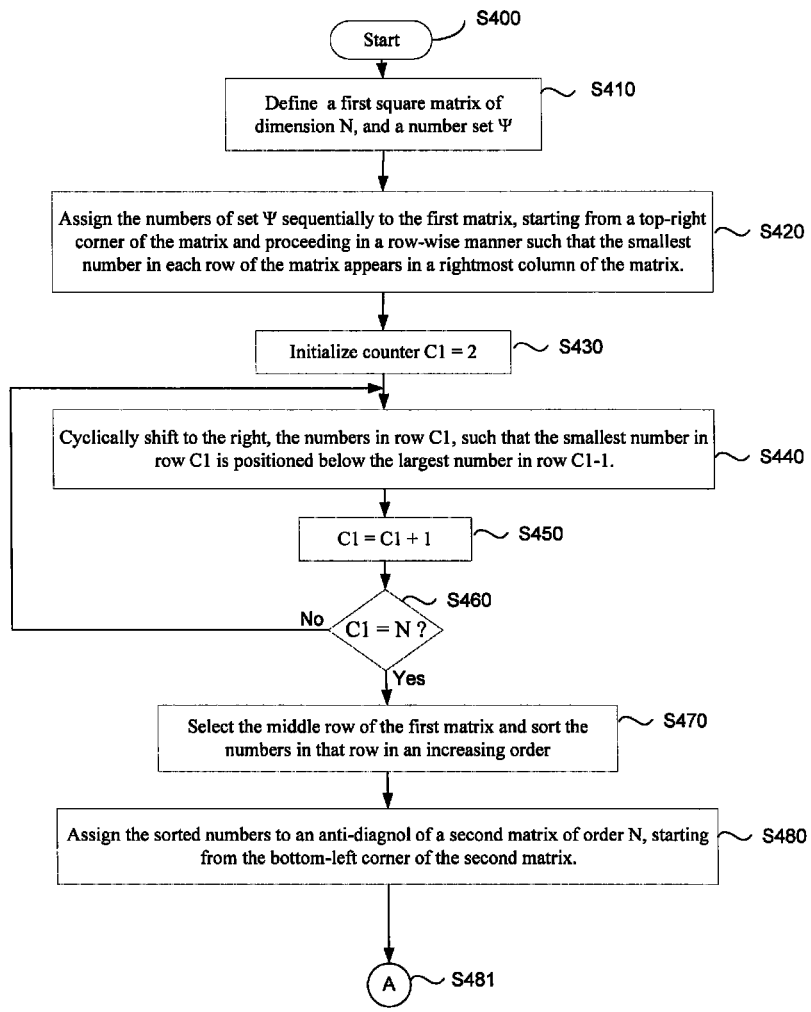
FIGS. 4A and 4B illustrate a flowchart depicting the steps performed to compute an allocation matrix.
Figure 4B:
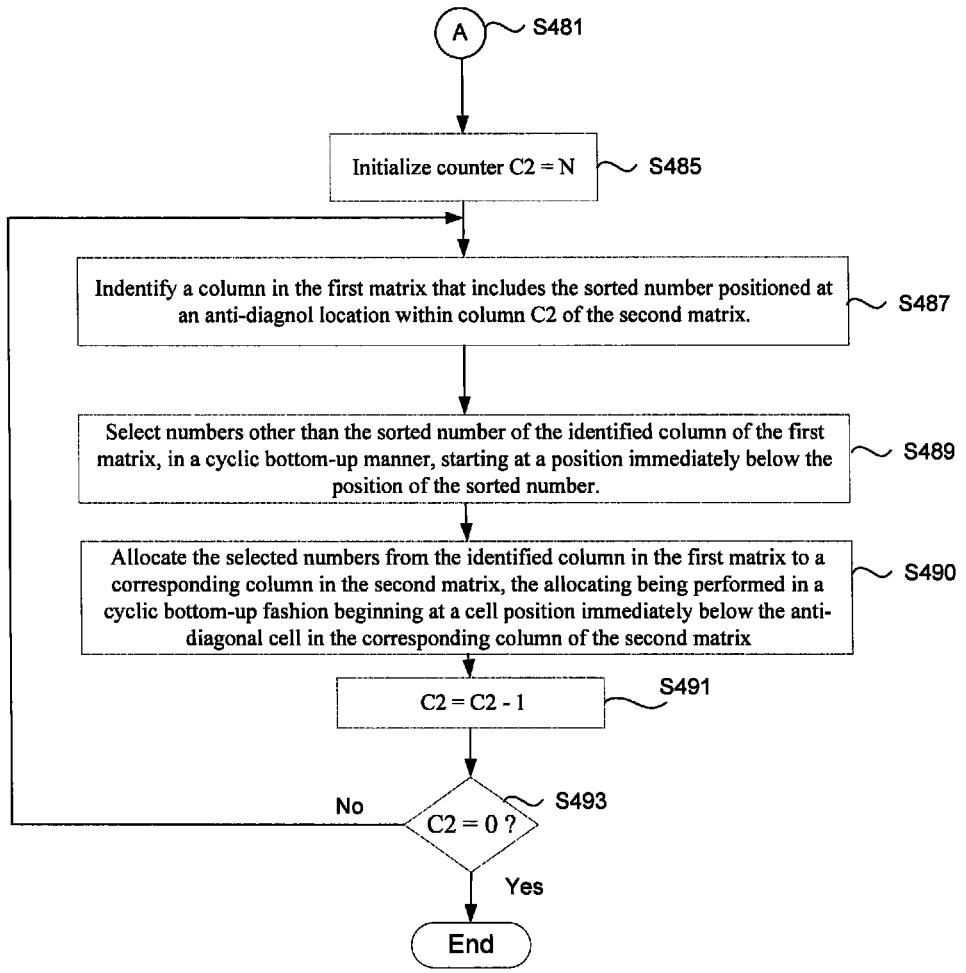

FIGS. 4A and 4B illustrate a flowchart depicting the steps performed by a controller to determine the length of each error-detecting-code block of data packets that are transmitted in a time-frame. According to one embodiment, the problem of determining the length of each error-detecting-code block of the data packet is transformed into a problem of computing an allocation matrix.

The process starts in step S400 and proceeds to step S410, wherein a first square matrix of dimension n and a predetermined number set ψ are selected by the network switch. The dimension of a square matrix is defined herein as the number of rows or columns included in the matrix. Thus, a square matrix of dimension N includes N rows and N columns. The square matrix therefore has a total of $N^2$ cells, wherein each cell can include one number. According to an embodiment, the dimension of the first matrix as well as the predetermined number set may be based on a predetermined number of data packets that are to be transmitted in a time-frame.

For the sake of convenience, the steps of FIG. 4A and FIG. 4B are described with illustrations depicted in FIGS. 5A-5C, FIG. 6, and FIG. 7A and FIG. 7B. In the example illustrated in these figures, the square matrix has a dimension of N=5 (that is a square 5×5 matrix), and the predetermined set of numbers ψ includes the numbers 1, 2, 3 ... 24 and 25.

In step S420, the numbers of the set ψ are sequentially assigned to the first square matrix starting from a top right corner of the matrix and proceeding in a row-wise manner such that the smallest number in each row of the matrix appears in a right-most column of the matrix. For instance, FIG. 5A depicts the first square matrix 300 of dimension N=5 and illustrates the sequential assignment of the numbers 1-25 of the predetermined number set w. Note that for each row of the first matrix 300 (row 1-row 5) the smallest numbers 1, 6, 11, 16, and 21 appear in column 1 of the first matrix 300.

The process then proceeds to step S430, wherein a first counter C1 is initialized with a value of 2. The process in step S440 cyclically shifts in a rightward direction the numbers in row C1 such that the smallest number in row C1 is positioned below the largest number in row C1-1. For instance, as illustrated in FIG. 5B, the numbers are shifted in a cyclic fashion to the right, that is, the number 6 is shifted from column 1 to column 5 of the first matrix. The other numbers 7, 8, 9, and 10 also follow the same process of being cyclically shifted to the right. The rightward direction of performing the cyclic shift operation is depicted by 301 in FIG. 5B.

The process then proceeds to step S450, wherein the value of the counter C1 is incremented by 1.

In step S460, a query is made to determine whether the value of the counter C1 is equal to the dimension of the first matrix, that is, N. If the response to the query is negative, the process loops back to step S440, wherein the process of cyclically shifting the numbers of the next row is continued. If the response to the query is affirmative, the process proceeds to step S470. In other words, as represented in FIG. 5C, the process of step S440 is repeated starting at row 2 of the first matrix 300 and performed for each row thereafter. Note that for each of the rows (row 2-row 5), the smallest number in each row is positioned in a cell of the matrix 300 that appears under the cell containing the largest number in the preceding row.

The process then proceeds to step S470, wherein the middle row of the first matrix is selected and the numbers therein are sorted in an increasing order. For instance, as illustrated in FIG. 5C, the middle row of the first matrix 300, row 3 (depicted by the shaded cells) is selected and the numbers 12, 11, 15, 14, 13 belonging to the middle row are selected and sorted in an increasing fashion. The middle row of the first square matrix can be computed as N+½), wherein the dimension of the matrix N is an odd number.

The process then proceeds to step S480, wherein the sorted numbers from step S470 are assigned to an anti-diagonal of a second matrix. The second matrix has a dimension of N, same as the dimension of the first matrix. The anti-diagonal is represented in FIG. 6 by the shaded cells and includes the sorted numbers 11, 12, 13, 14, and 15 assigned starting from the bottom left corner of the second matrix. The process thereafter proceeds to step S481. The steps after step S481 are described with reference to FIG. 4B.

In step S485, a counter C2 is initialized with a value of N, which is the dimension of the second square matrix.

Figure 7A:
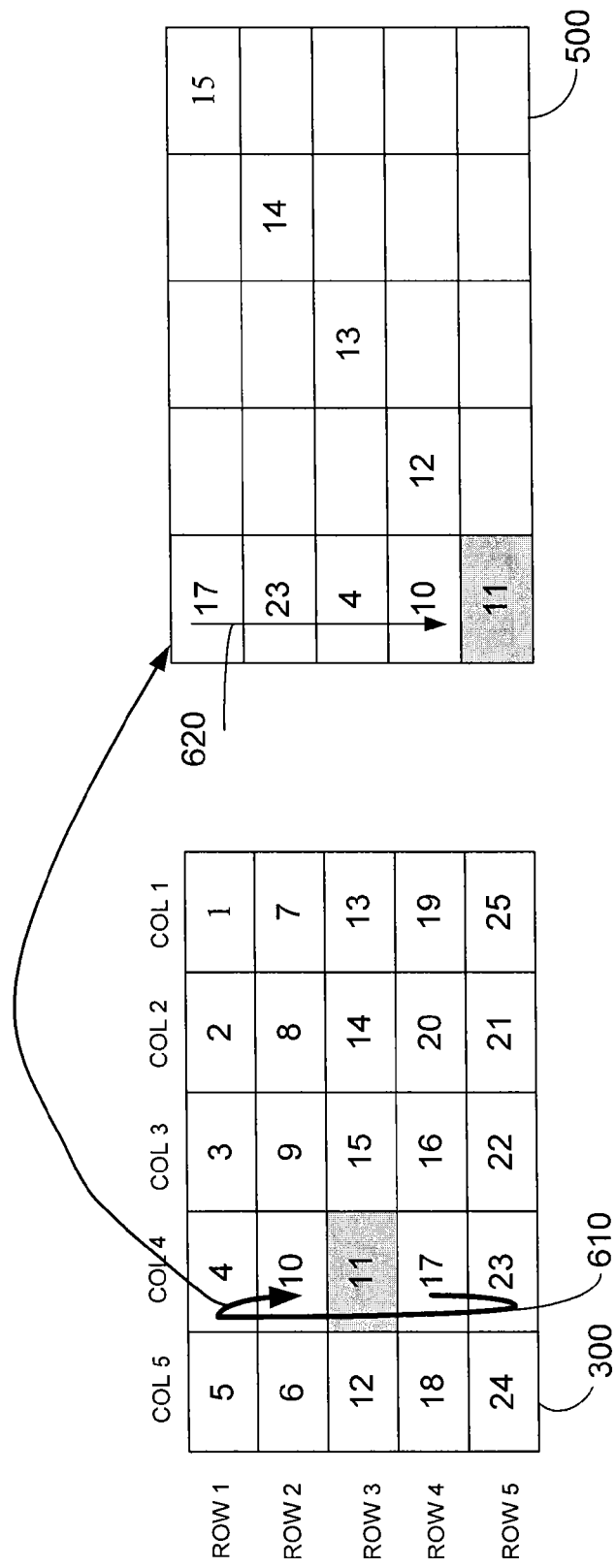

The process then proceeds to step S487, wherein a column within the first matrix is identified that includes the sorted number positioned at an anti-diagonal location within column C2 of the second matrix. Specifically as illustrated in FIG. 7A, the matrix 300 represents the first matrix, whereas the matrix 500 represents the second matrix. The number 11 appears in column N=5 of the second matrix 500 and is positioned at an anti-diagonal cell location positioned in the bottom-left corner of the matrix. In step S487, the controller identifies a column wherein this number is located within the first matrix 300. For instance, the number 11 appears in column 4 of the first matrix 300 as depicted by the shaded cell in row 3.

The process then proceeds to step S489, wherein the numbers other than the sorted number in the identified column of the first matrix are selected in a cyclic bottom-up fashion, starting at a position immediately below the position of the sorted number in the identified column. For example, the number 11 appears in column 4 of the first matrix 300. Thus, the other numbers within the column are selected in a bottom-up fashion represented by 610. Specifically, the selection of numbers proceeds in the order 17, 23, 4, and 10.

The process then proceeds to step S490, wherein the selected numbers are allocated by the controller to a column in the second matrix that includes the sorted number. The allocation begins in a cyclic bottom-up fashion beginning at a cell position immediately below the anti-diagonal cell that includes the sorted number in the second matrix. For instance, as shown in the second matrix 500 in FIG. 7A, the selected numbers 17, 23, 4, and 10 are positioned in column 5 in a cyclic bottom-up manner starting from a cell location located immediately below the anti-diagonal cell location. Thus, the number 17 is assigned to the first cell in column 5 of the second matrix 500. Note that the sequence of allocating the numbers in the column of the second matrix 500 is similar to the sequence/order in which the numbers are selected in the bottom-up fashion from the column of the first matrix.

The process then proceeds to step S491 wherein the value of the counter C2 is decremented by 1.

In step S493, a query is made to determine if the value of the counter C2 is equal to zero. If the response to the query is affirmative, the process ends, whereas if the response to the query is negative, the process loops back to step S487, wherein the process of selecting the numbers in a bottom-up fashion from the next column in the first matrix and the allocation process (of step S489) of assigning numbers to a corresponding column in the second matrix is repeated.

Figure 7B:
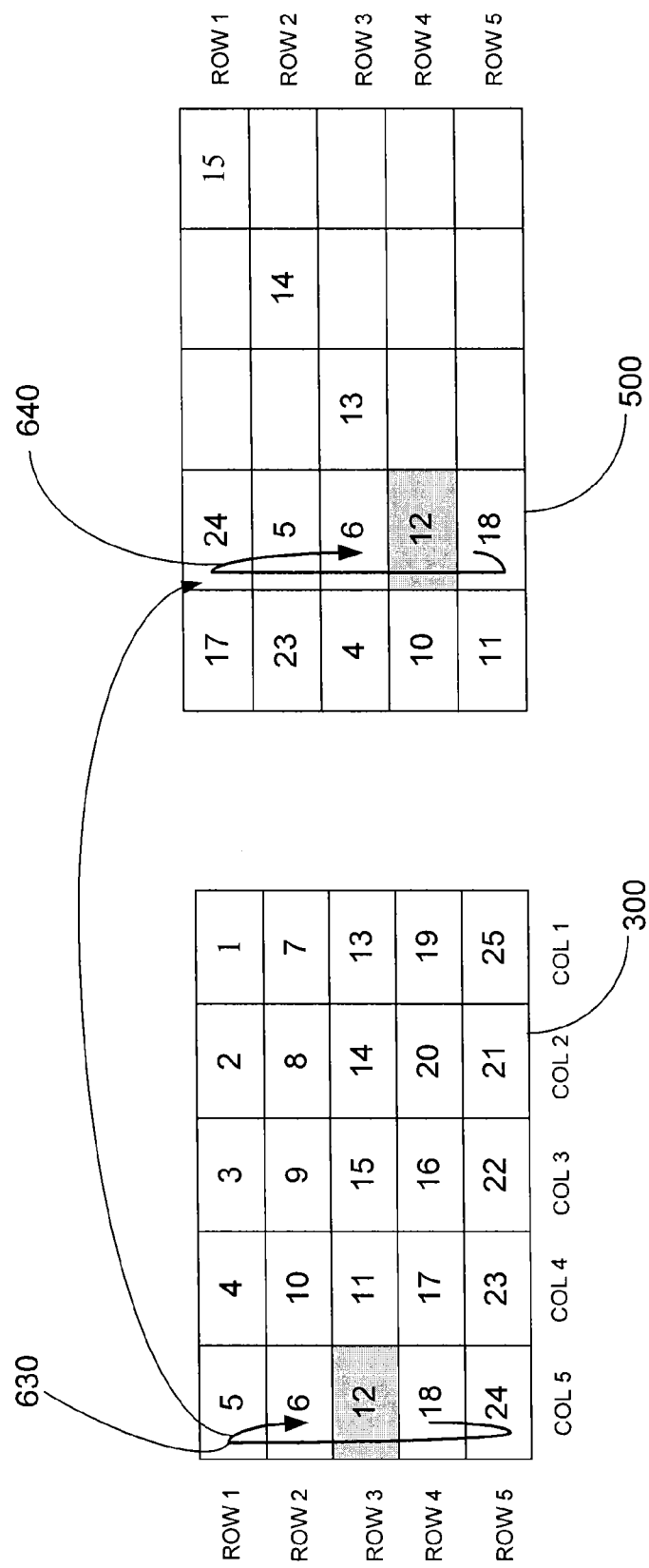

For example, as depicted in FIG. 7B, in the second iteration of step S487, the sorted number 12 that is assigned on the anti-diagonal of the second matrix 500 is identified in the first matrix 300. In this case, the sorted number 12 appears in the first column of the first matrix 300 and the process of selecting the other numbers within that column and cyclically arranging them in a bottom-up manner in the corresponding column of the second matrix 500 is performed. The process continues until each column is filled with corresponding numbers from a column of the first matrix. Upon completion of the process, the second matrix as represented in FIG. 7C is obtained. The controller in the network switch may be further configured to select a row, column, diagonal or the anti-diagonal and assign the numbers included therein as the length of the error-detection-code blocks for the data packets belonging to a particular frame. For instance, the controller can sort the entries in the selected row, column, diagonal or the anti-diagonal to correspond to the sorted order of the priority levels of the data packets and correspondingly assign as the lengths of each error-detecting code block the number on the corresponding cell of the selected row, column, diagonal or the anti-diagonal of the second square matrix.

In FIG. 7C, the second matrix has a dimension of N=5 and the predetermined set $\psi$ includes numbers from 1 to 25. Upon performing the steps of FIGS. 4A and 4B, the numbers are arranged in the second matrix in such a way that the sum of each row, column, the diagonal, and the anti-diagonal of the second matrix 500 are equal to the same value. Further, note that the median number of the predetermined set $\psi$ (number 13 in the present example) appears in a central cell location of the second matrix 500.

For a given matrix of dimension N, and the predetermined set having a largest number K, and a smallest number Y, the median number W of the predetermined set $\psi$ is computed as follows:

$$W=(K+1)-[(N^2+1)/2] \quad (4)$$

According to one embodiment, the predetermined set can be determined computed based on a predetermined largest number K and a dimension of the matrix N. In this case the smallest number of the predetermined set is computed as follows:

$$K-Y=N^2-1 \quad (5)$$

Furthermore, as stated before, the sum of each row, column, diagonal, and the anti-diagonal of the second matrix is computed as a product of the median number of the predetermined set $\psi$ and the dimension of the matrix. Thus, the sum $(S_N)$ is computed as:

$$S_N = W*N \quad (6)$$

For a matrix of dimension N, the number of data packets P whose error-detection-code block lengths can be computed by the method described in FIGS. 4A and 4B is P=2N+2. Thus, the dimension N of a matrix may be selected based either on the number of data packets that are transmitted in a time-frame or given the value of P, the number of data packets to be transmitted in the time-frame can be determined as: N=(P−2)/2.

Note that the present disclosure is in no way limited to the specific 5×5 matrix depicted in FIGS. 5A to 5B, 6, and FIGS. 7A to 7C. Specifically, the dimension of a matrix and the predetermined number set may be determined based on the application at hand. For instance, as shown in Table I, the matrix can be a 3×3 matrix having sequential numbers 1-9, or the matrix can be a 7×7 matrix as depicted in Table II including numbers 1 to 49.

a dimension N=5, and a smallest number of 22 in the predetermined set ψ, the numbers of the matrix can be computed using equations (4) and (5). Specifically, the matrix as depicted in Table III includes the numbers from 22 to 46.

Furthermore, the first square matrix can be a 13×13 matrix as depicted in Table IV. As shown in Table V, for a given N×N square matrix, the predetermined set can also include an even distribution of negative as well as positive numbers around a central number (in this case number 0). Note that the sum of each row, column, diagonal, and anti-diagonal of such a matrix is equal to 0. Furthermore, the first matrix can also include a predetermined set of odd numbers such as 1, 5, 9, 13, 17, 21, 25, 29, and 33, as shown in Table VI. Note that for each of the matrices depicted in Table I to Table VI, the sum of each row, column, diagonal, and anti-diagonal total to the same value which can be computed by using equation (6).

TABLE IV

Matrix of dimension N = 13

| 103 | 118 | 133 | 148 | 163 | 178 | 11 | 26 | 41 | 56 | 71 | 86 | 101 |
|---|---|---|---|---|---|---|---|---|---|---|---|---|
| 117 | 132 | 147 | 162 | 177 | 23 | 25 | 40 | 55 | 70 | 85 | 100 | 102 |
| 131 | 146 | 161 | 176 | 22 | 24 | 39 | 54 | 69 | 84 | 99 | 114 | 116 |
| 145 | 160 | 175 | 21 | 36 | 38 | 53 | 68 | 83 | 98 | 113 | 115 | 130 |
| 159 | 174 | 20 | 35 | 37 | 52 | 67 | 82 | 97 | 112 | 127 | 129 | 144 |
| 173 | 19 | 34 | 49 | 51 | 66 | 81 | 96 | 111 | 126 | 128 | 143 | 185 |
| 18 | 33 | 48 | 50 | 65 | 80 | 95 | 110 | 125 | 140 | 124 | 157 | 172 |
| 32 | 47 | 62 | 64 | 79 | 94 | 109 | 124 | 139 | 141 | 156 | 171 | 17 |
| 46 | 61 | 63 | 78 | 93 | 108 | 123 | 138 | 153 | 155 | 170 | 16 | 31 |
| 60 | 75 | 77 | 92 | 107 | 122 | 137 | 152 | 154 | 169 | 15 | 30 | 45 |
| 74 | 76 | 91 | 106 | 121 | 136 | 151 | 166 | 168 | 14 | 29 | 44 | 59 |
| 88 | 90 | 105 | 120 | 135 | 150 | 165 | 167 | 13 | 28 | 43 | 58 | 73 |
| 89 | 104 | 119 | 134 | 149 | 164 | 179 | 12 | 27 | 42 | 57 | 72 | 87 |

TABLE I

Matrix of dimension N = 3

| 8 | 1 | 6 |
|---|---|---|
| 3 | 5 | 7 |
| 4 | 9 | 2 |

TABLE II

Matrix of dimension N = 7

| 30 | 39 | 48 | 1 | 10 | 19 | 28 |
|---|---|---|---|---|---|---|
| 38 | 47 | 7 | 9 | 18 | 27 | 29 |
| 46 | 6 | 8 | 17 | 26 | 35 | 37 |
| 5 | 14 | 16 | 25 | 34 | 36 | 45 |
| 13 | 15 | 24 | 33 | 42 | 44 | 4 |
| 21 | 23 | 32 | 41 | 43 | 3 | 12 |
| 22 | 31 | 40 | 49 | 2 | 11 | 20 |

TABLE III

Matrix of dimension N = 7, K = 22

| 38 | 45 | 22 | 29 | 36 |
|---|---|---|---|---|
| 44 | 26 | 28 | 35 | 37 |
| 25 | 27 | 34 | 41 | 43 |
| 31 | 33 | 40 | 42 | 24 |
| 32 | 39 | 46 | 23 | 30 |

According to another embodiment, the numbers in the predetermined set may be computed based on the predetermined dimension of the matrix and a smallest number of the predetermined set ψ. For instance, as shown in Table III, for

TABLE V

Matrix of dimension N = 7 including positive and negative numbers

| −18 | −19 | −20 | −21 | −22 | −23 | −24 |
|---|---|---|---|---|---|---|
| −17 | −11 | −12 | −13 | −14 | −15 | −16 |
| −9 | −10 | −4 | −5 | −6 | −7 | −8 |
| −1 | −2 | −3 | 3 | 2 | 1 | 0 |
| 7 | 6 | 5 | 4 | 10 | 9 | 8 |
| 15 | 14 | 13 | 12 | 11 | 17 | 16 |
| 23 | 22 | 21 | 20 | 19 | 18 | 24 |

TABLE VI

Matrix of dimension N = 3 including positive numbers

| 9 | 5 | 1 |
|---|---|---|
| 13 | 21 | 17 |
| 29 | 25 | 33 |

According to another embodiment of the present disclosure, the method described with reference to FIGS. 4A and 4B can also be implemented by a network bandwidth allocator, that is, a controller, in order to allocate bandwidth channels from a plurality of bandwidth channel types to the users of a network. The network bandwidth allocator can be configured to assign bandwidth channels to users in a fair manner.

Figure 8:
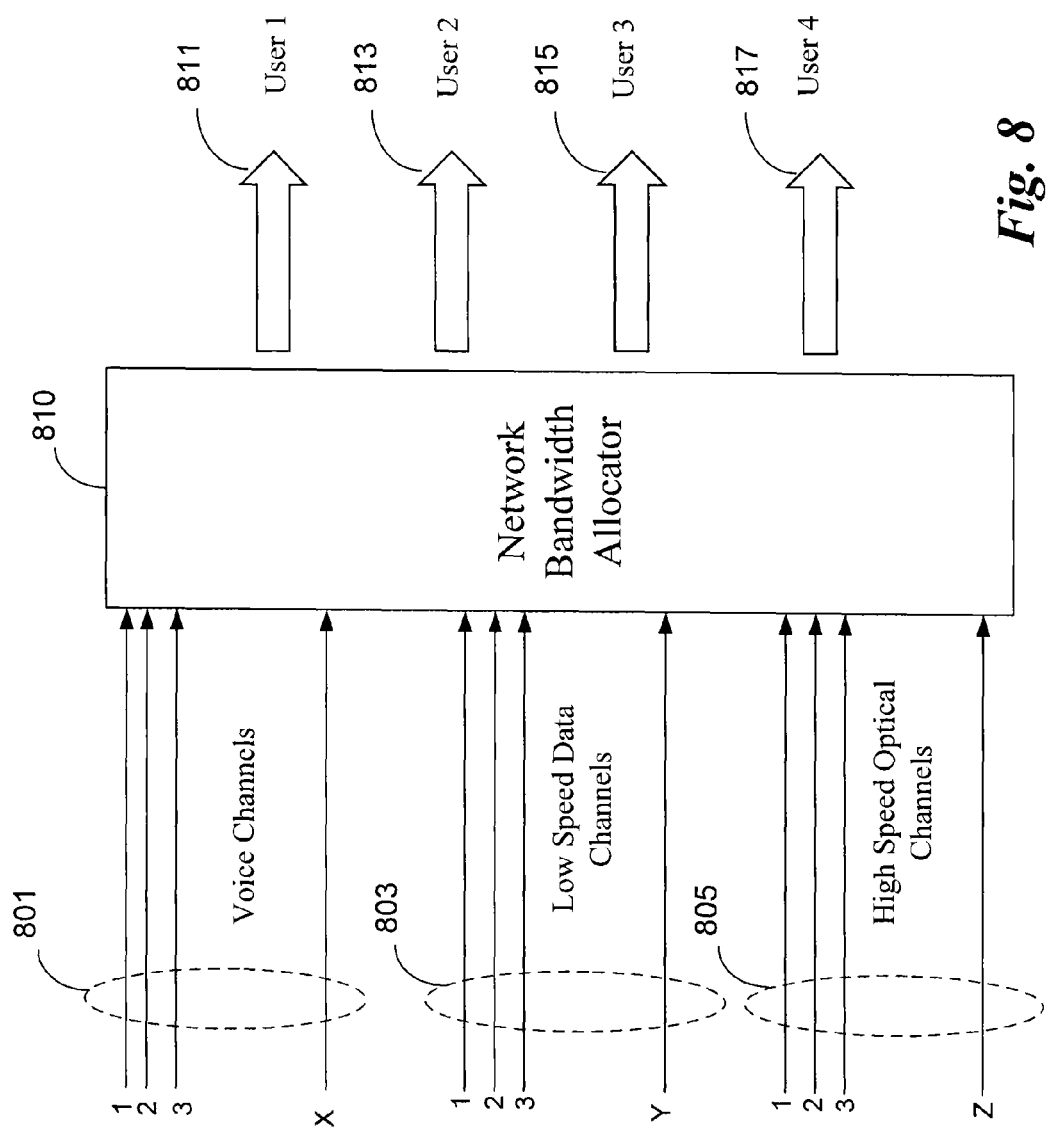
FIG. 8 depicts a network bandwidth allocator (controller) according to an embodiment.

For instance, FIG. 8 illustrates a network bandwidth allocator 810 that allocates bandwidth channels from a plurality of bandwidth channel types 801, 803, and 805. The bandwidth channels included in 801, for instance, may be voice channels, the bandwidth channels included in 803 can be low-speed data channels, whereas the bandwidth channels included in 805 can be high-speed optical channels. In FIG. 8, four users 811, 813, 815, and 817 transmit bandwidth requests to a network bandwidth allocator, wherein each request identifies a priority of the bandwidth channel type desired by the user. The priority of each request transmitted from the user may be based on the application at hand, a specific time period of the day, or the like. For instance, a user who is engaged in a scientific experiment may require a higher number of high-speed optical channels as compared to the number of low-speed data channels, in order to transfer experiment data from one laboratory location to another. Similarly, a user employed in a customer service center may require a higher number of voice channels during the morning hours of the day (based on a geographical location) as compared to the number of high-speed optical channels.

The network bandwidth allocator can implement the method described in FIGS. 4A and 4B to compute an allocation matrix (the second allocation matrix) in order to determine the distribution of bandwidth channels that is allocated to each user.

Figure 9:
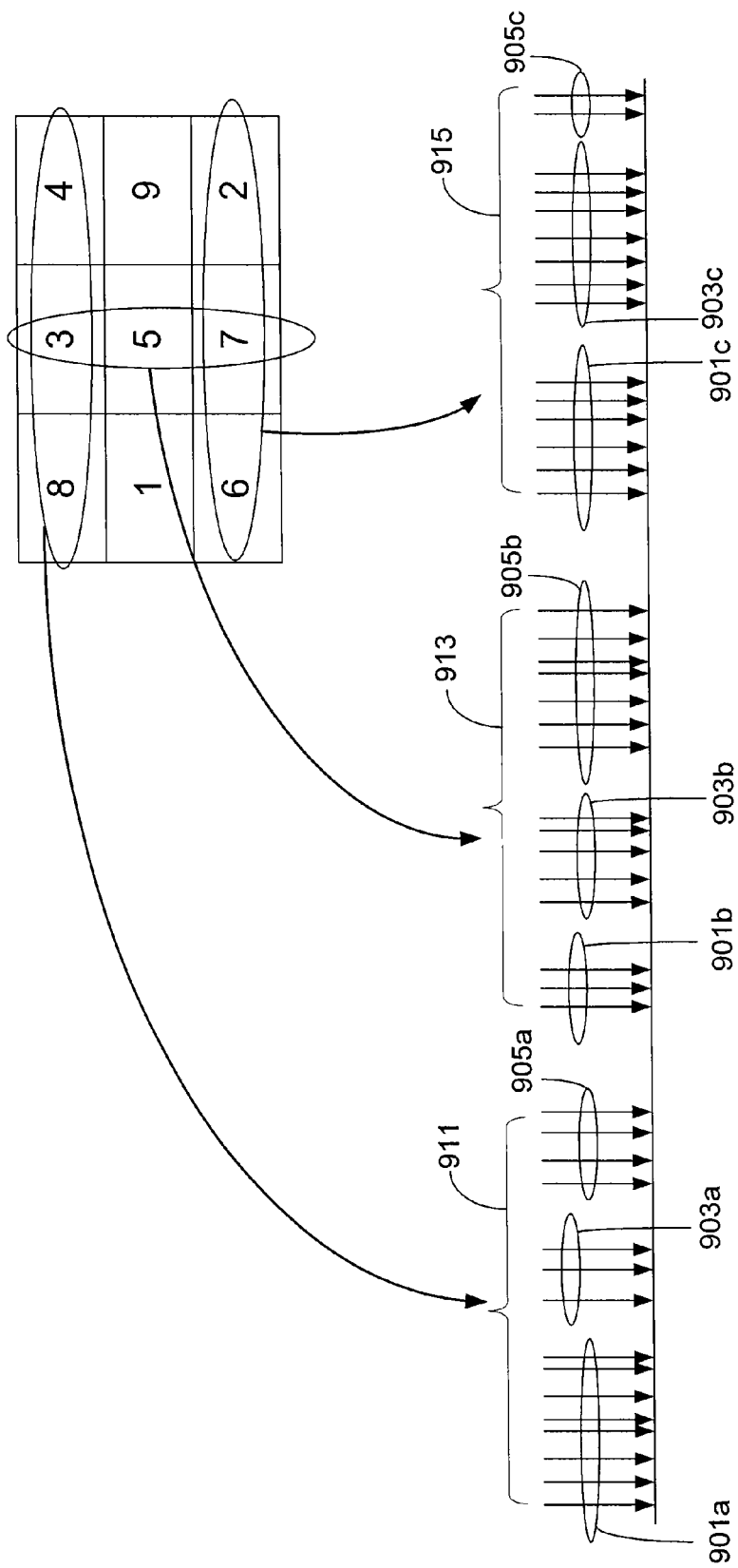
FIG. 9 depicts an illustrative example depicting the allocation of bandwidth channels determined by the network bandwidth allocator.

FIG. 9 illustrates an example depicting the allocation of bandwidth channels determined by the network bandwidth allocator. For sake of convenience, FIG. 9 depicts the bandwidth distribution for three users 911, 913, and 915. The three types of bandwidth channel types considered in FIG. 9 are voice channels, low-speed data channels, and high-speed optical channels. The distribution of these bandwidth channel types for the three users are represented as 901a-901c, 903a-903c, and 905a-905c.

As shown in FIG. 9, the network bandwidth allocator can compute an allocation matrix that has a dimension, for example, N=3 by the process described in FIGS. 4A and 4B. The request submitted by each user to the network bandwidth allocator includes a preference in the bandwidth channel type desired by the user. For example, user 911 may transmit a request to the network bandwidth allocator indicating an order of preference of the bandwidth channel types desired by the user as: voice channels, high-speed optical channels, and low-speed data channels. This implies that a user 911 desires a higher number of voice bandwidth channels as compared to the number of low-speed data channels. The network bandwidth allocator upon computing the allocation matrix 500 as shown in FIG. 9 can select any one row, column, diagonal, or the anti-diagonal to represent the allocation of the bandwidth channel types to user 911.

For instance, as shown in FIG. 9, row 1 including the numbers 8, 3, 4 is selected as the row to represent the distribution of the bandwidth channel types for user 911. Upon selecting a particular row, column, or a diagonal, the network bandwidth allocator may be configured to sort the entries in the selected row, column, or diagonal in order to correspond to the preferential order of the bandwidth channel types desired by the user. In this case, since row 1 (including the numbers 8, 3, 4) is selected as the row corresponding to the bandwidth distribution, 8 voice channels, 4 high-speed optical channels, and 3 low-speed data channels can be allocated to user 911. The distribution of bandwidth channel types amongst the other users 913 and 915 may follow a similar process to that as described above.

Figure 10:
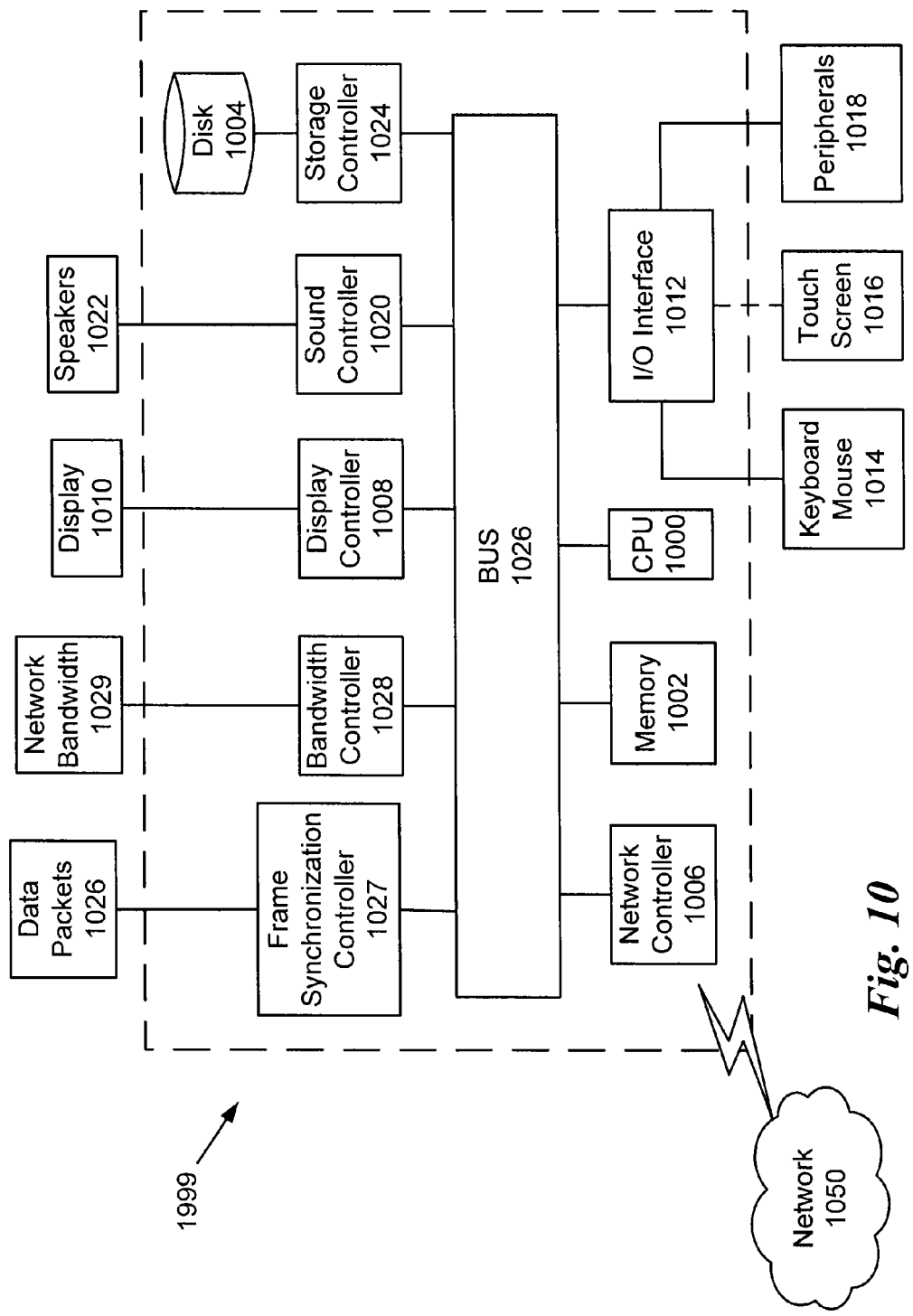
FIG. 10 illustrates a block diagram of a computing device according to an embodiment.

FIG. 10 illustrates a block diagram of a computing device 1999 that can be included in the network switch according to an embodiment. The computing device (controller) 1999 may also be alternatively included in a network bandwidth allocator. In FIG. 10, the computing device 1999 includes a CPU 1000 which performs the processes described above. The process data and instructions may be stored in memory 1002. These processes and instructions may also be stored on a storage medium disk 1004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the system communicates, such as a server or computer.

Further, the claimed advancements may be provided as a utility application, background daemon, or component of an operating system, or combination thereof, executing in conjunction with CPU 1000 and an operating system such as Microsoft Windows 7, UNIX, Solaris, LINUX, Apple MAC-OS and other systems known to those skilled in the art. CPU 1000 may be a Xenon or Core processor from Intel of America or an Opteron processor from AMD of America, or may be other processor types that would be recognized by one of ordinary skill in the art. Alternatively, the CPU 1000 may be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above.

The server 1999 in FIG. 10 also includes a network controller 1006, such as an Intel Ethernet PRO network interface card from Intel Corporation of America, for interfacing with network 1050. As can be appreciated, the network 1050 can be a public network, such as the Internet, or a private network such as an LAN or WAN network, or any combination thereof and can also include PSTN or ISDN sub-networks. The network 1050 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The server 1999 further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or Desk-Jet from Hewlett Packard. A sound controller 1020 may also be provided in the computer 1999, such as Sound Blaster X-Fi Titanium from Creative, to interface with speakers/microphone 1022 thereby providing sounds and/or music.

The computing device 1999 may also include a bandwidth controller 1028 that is configured to allocate network bandwidth 1029 to user requests that desire a certain number of bandwidth channels of a certain type. Furthermore, the computing device 1999 also includes a frame synchronization controller 1027 that is configured to align data packets 1026 received by a network switch. Frame alignment ensures synchronicity throughout the network and enables a time-division multiplexed network to be realized. Specifically, the time-frames that include a predetermined number of packets can be switched accurately at time-frame boundaries.

The general purpose storage controller 1024 connects the storage medium disk 1004 with communication bus 1026, which may be an ISA, EISA, VESA, PCI, or similar, for interconnecting all of the components of the robot-guided medical procedure system. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

It should be noted that, as used in the specification and the appended claims, the singular forms "a," "an," and "the" include plural referents unless the context clearly dictates otherwise.

The invention claimed is:

1. A method of determining sizes of error-detection-code blocks of data packets that are transmitted in time-frames, the method comprising:
   receiving, by a switch, a predetermined number of data packets that are to be transmitted in each time-frame, each data packet within the time-frame having a unique priority level;
   assigning sequentially, by a processing circuit, numbers of a predetermined set to cells of a first square matrix;
   shifting cyclically by the processing circuit, starting from an initial row of the first square matrix, the assigned numbers of each row in a rightward direction, such that the smallest number in each row is placed under a largest number of the preceding row;
   sorting in an increasing fashion, by the processing circuit, the numbers of a middle row of the first square matrix;
   ordering by the processing circuit, the sorted numbers to an anti-diagonal of a second square matrix;
   identifying, for each sorted number assigned to the anti-diagonal of the second square matrix, a column in the first square matrix that includes the sorted number;
   selecting, by the processing circuit, for each identified column in the first square matrix, numbers other than the sorted number in the identified column, the selecting being performed in a cyclic bottom-up fashion starting at a row immediately following the middle row in the first square matrix;
   allocating by the processing circuit, the selected numbers from the identified column in the first square matrix to a corresponding column in the second square matrix, the allocating being performed in a cyclic bottom-up fashion beginning at a cell position immediately below the anti-diagonal cell in the corresponding column of the second square matrix; and
   assigning, based on the unique priority levels of the data packets within the time-frame, data blocks of sizes corresponding to the numbers of a selected row, column, or diagonal of the second square matrix.

2. The method of claim 1, wherein the assigning sequentially step further comprises assigning the numbers of the predetermined set to the cells of the first square matrix, starting at a top-right corner of the first square matrix and proceeding in a row-wise fashion such that a smallest number in each row of the first square matrix is assigned to a rightmost cell of the row.

3. The method of claim 1, wherein the first and second square matrices are of a dimension equal to the predetermined number of data packets that are transmitted in the time-frame.

4. The method of claim 3, wherein the predetermined set includes numbers that are sorted in an increasing fashion, the cardinality of the predetermined set being equal to a square of the dimension of the first square matrix.

5. The method of claim 3, wherein the dimension of the first square matrix is an odd number and the predetermined set includes only positive numbers, the magnitude of each positive number corresponding to the size in number of binary bits of the error-detection-code blocks of the data packets.

6. The method of claim 3, wherein the dimension of the first square matrix is an odd number and the predetermined set includes positive and negative numbers evenly distributed around a median number.

7. The method of claim 6, wherein the magnitude of each positive and negative number corresponds to the size in number of binary bits of the error-detection-code blocks of the data packets, the data packet assigned a negative number being represented by a binary one's complement of the error-detection-code of the data packet that is assigned the corresponding positive number.

8. The method of claim 1, wherein the initial row of the first square matrix is the second row of the first square matrix.

9. The method of claim 1, wherein the ordering step further comprises ordering the sorted numbers to the anti-diagonal of the second square matrix starting at a bottom-left corner of the second square matrix.

10. The method of claim 1, further comprising:
    arranging, by the processing circuit, the data packets within the time-frame in increasing order priority level; and
    sorting, by the processing circuit, the numbers of the selected row, column, or diagonal of the second square matrix, wherein the sorted numbers are assigned to the arranged data packets sequentially and correspond to the size in number of binary bits of the error-detection-code block of the respective data packet.

11. The method of claim 1, wherein a total size of the error-detection-code blocks of each time-frame are equal to a sum of the numbers of the selected row, column, or diagonal of the second square matrix.

12. The method of claim 11, wherein the sum is equal to a product of a dimension of the second square matrix and a median value of the predetermined set.

13. The method of claim 12, wherein the median value of the predetermined set if positioned in a center cell of the second square matrix.

14. A network switch configured to determine sizes of error-detection-code blocks of data packets that are transmitted in time-frames, the switch comprising:
    a receiver configured to receive a predetermined number of data packets that are to be transmitted in each time-frame, each data packet within the time-frame having a unique priority level; and
    circuitry configured to
      assign sequentially, numbers of a predetermined set to cells of a first square matrix,
      shift cyclically, starting from an initial row of the first square matrix, the assigned numbers of each row in a rightward direction, such that the smallest number in each row is placed under a largest number of the preceding row,
      sort in an increasing fashion, the numbers of a middle row of the first square matrix,
      order the sorted numbers to an anti-diagonal of a second square matrix,
      identify, for each sorted number assigned to the anti-diagonal of the second square matrix, a column in the first square matrix that includes the sorted number,
      select for each identified column in the first square matrix, numbers other than the sorted number in the identified column, the selection being performed in a cyclic bottom-up fashion starting at a row immediately following the middle row in the first square matrix allocate the selected numbers from the identified column in the first square matrix to a corresponding column in the second square matrix, the allocation being performed in a cyclic bottom-up fashion beginning at a cell position immediately below the anti-diagonal cell in the corresponding column of the second square matrix, and assign based on the unique priority levels of the data packets within the time-frame, data blocks of sizes corresponding to the numbers of a selected row, column, or diagonal of the second square matrix.

15. The network switch of claim 14, wherein the circuitry is configured to assign the number of the predetermined set to the cells of the first square matrix, starting at a top-right corner of the first square matrix and proceeding in a row-wise fashion such that a smallest number in each row of the first square matrix is assigned to a rightmost cell of the row.

16. The network switch of claim 14, wherein the first and second square matrices are of a dimension equal to the predetermined number of data packets that are transmitted in the time-frame and the initial row of the first square matrix is the second row of the matrix.

17. The network switch of claim 16, wherein the dimension of the first square matrix is an odd number and the predetermined set includes only positive numbers, the magnitude of each positive number corresponding to the size in number of binary bits of the error-detection-code blocks of the data packets.

18. The network switch of claim 14, wherein a total size of the error-detection-code blocks of each time-frame are equal to a sum of the numbers of the selected row, column, or diagonal of the second square matrix, the sum being equal to a product of a dimension of the second square matrix and a median value of the predetermined set.

19. A method of allocating bandwidth channels from a plurality of bandwidth channel types, the method comprising:

receiving bandwidth request from a predetermined number of users, each request identifying a priority of a bandwidth channel type desired by the user;

assigning sequentially, by a processing circuit, numbers of a predetermined set to cells of a first square matrix;

shifting cyclically by the processing circuit, starting from an initial row of the first square matrix, the assigned numbers of each row in a rightward direction, such that the smallest number in each row is placed under a largest number of the preceding row;

sorting in an increasing fashion, by the processing circuit, the numbers of a middle row of the first square matrix;

ordering by the processing circuit, the sorted numbers to an anti-diagonal of a second square matrix;

identifying, for each sorted number assigned to the anti-diagonal of the second square matrix, a column in the first square matrix that includes the sorted number;

selecting, by the processing circuit, for each identified column in the first square matrix, numbers other than the sorted number in the identified column, the selecting being performed in a cyclic bottom-up fashion starting at a row immediately following the middle row in the first square matrix;

allocating by the processing circuit, the selected numbers from the identified column in the first square matrix to a corresponding column in the second square matrix, the allocating being performed in a cyclic bottom-up fashion beginning at a cell position immediately below the anti-diagonal cell in the corresponding column of the second square matrix; and assigning, based on the priority of the bandwidth channel type desired by the user, a number of bandwidth channels of each type, wherein the number corresponds to numbers of a selected row, column, or diagonal of the second square matrix.

20. The method of claim 19, wherein a total bandwidth assigned to each user is equal to a sum of the numbers of the selected row, column, or diagonal of the second square matrix, the sum being equal to a product of a dimension of the second square matrix and a median value of the predetermined set.

* * * * *